United States Patent
Kenyon et al.

(10) Patent No.: US 6,957,195 B1
(45) Date of Patent: Oct. 18, 2005

(54) PLAYER-CENTRIC METHOD AND APPARATUS FOR CREATING, DISTRIBUTING, AND CONSUMING CONTENT

(75) Inventors: Jeremy A. Kenyon, Kirkland, WA (US); Alex K. St. John, Kirkland, WA (US)

(73) Assignee: Wildtangent, Redmond, WA (US)

( * ) Notice: Subject to any disclaimer, the term of this patent is extended or adjusted under 35 U.S.C. 154(b) by 589 days.

(21) Appl. No.: 09/399,064

(22) Filed: Sep. 18, 1999

(51) Int. Cl.[7] .............................................. G06F 17/60
(52) U.S. Cl. ............................ 705/58; 705/50; 705/53; 705/51
(58) Field of Search ............................ 705/50, 51, 52, 705/53, 77

(56) References Cited

U.S. PATENT DOCUMENTS

| | | | |
|---|---|---|---|
| 5,634,012 A | * 5/1997 | Stefik et al. | ................. 395/239 |
| 5,745,678 A | 4/1998 | Herzberg et al. | |
| 5,765,152 A | 6/1998 | Erickson | |
| 5,825,883 A | * 10/1998 | Archibald et al. | ............ 380/25 |
| 5,892,900 A | * 4/1999 | Ginter et al. | ................ 395/186 |
| 5,925,127 A | * 7/1999 | Ahmad | ....................... 713/200 |

FOREIGN PATENT DOCUMENTS

| | | | | |
|---|---|---|---|---|
| JP | 2000013757 A | * 1/2000 | ............ | H04N/7/08 |
| WO | WO 95/34857 | 12/1995 | | |

OTHER PUBLICATIONS

Http://www.tourolaw.edu/2ndcircuit/September99/97–9181.html.*

"Tasini vs New York Times: changing copyright law for electronic posting of articles", Online Libraries & Microcomputers, Nov. 1999.*

* cited by examiner

*Primary Examiner*—James P. Trammell
*Assistant Examiner*—Calvin L Hewitt
(74) *Attorney, Agent, or Firm*—Schwabe, Williamson & Wyatt, P.C.

(57) ABSTRACT

A player-centric content creation, distribution and consumption method is disclosed. A computer implemented-content authoring tool (CI-CAT) is distributed to a content creator. The CI-CAT includes an identification function for embedding control information, such as a content owner identifier, in a content created using the CI-CAT, to facilitate compensation of a developer of the CI-CAT. A computer implemented-content player (CI-CP) is provided to a consumer. The CI-CP includes a recovery function for recovering the control information from the content when the content is rendered by the player, and a reporting function for reporting rendering of the content using the recovered control information. During operation, the content is received by the consumer, and rendered using the CI-CP. The control information is recovered, and rendering of the content, using the recovered control information, is reported by the CI-CP, to facilitate compensating the developer(s) of the CI-CAT.

42 Claims, 5 Drawing Sheets

PLAYER-CENTRIC METHOD AND APPARATUS FOR CREATING, DISTRIBUTING, AND CONSUMING CONTENT

BACKGROUND OF THE INVENTION

1. Field of the Invention

The present invention relates to the fields of multi-media content creation, distribution and consumption. More specifically, the present invention is a player-centric approach to content creation, distribution and consumption.

2. Background Information

Numerous content creation, distribution and consumption approaches are known and practiced in the art. The term "content" as used herein in this application is intended to include all types of content known in the art, including motion pictures, music, games, etc., in single or multiple media formed from selected combinations of audio, video, graphics, texts, data and so forth.

FIG. 1 illustrates a performance promoter centric approach known in the art. As illustrated, under this approach, content creator 102 using one or more content authoring or creation tools (not shown) creates and distributes content 104 to performance promoter 106. Similarly, player manufacturer 108 develops, manufactures and distributes player 110 to performance promoter 106. Depending on the content, player 110 may represent multiple pieces of player equipment developed, manufactured and distributed by one or more player manufacturers 108. In either case, content 104 as well as player 110 may be distributed via one or more intermediate distributors (not shown). In any event, content 104 is rendered by performance promoter 106, for consumption by consumers 112, using player 110. Under this approach, typically performance promoter 106 pays player manufacturer 108 for the right to own or use player 110, and content creator 102 for the right to render content 104 for consumer 112. In turn, performance promoter 106 is compensated by consumers 112 for the rights to consume content 104. The compensations performance promoter 106 pays player manufacturer 108 and content creator 102 are typically in proportion to projected usage of player 110 and consumption of content 104, as opposed to actual usage and consumption. In other words, performance promoter 106 typically bears the burden of the initial investment as well as the risk of failure. An example of content that uses this form of content creation, distribution and consumption is motion pictures. Content creator 102 is a motion picture producer, whereas player manufacturer 108 is motion picture projection equipment manufacturer. Performance promoter 106 is a theatre operator, and consumers 112 are theatre goers.

While this approach remains a viable and significant approach for creating, distributing and consuming contents such as motion pictures, the approach has the obvious disadvantage in that significant capital investment is required to become performance promoter 106, and yet performance promoter 106 bears most of the risk. As a result, relatively speaking, only limited aggregate consumption capacity is available for content 104 created by content creator 102, and only limited demand exists for player 110 available from player manufacturer 108.

In view of these and other limitations, the approach of FIG. 2 is also employed to distribute and consume contents such as motion pictures, as well as other contents such as music. Under this approach, content creator 102' distributes content 104' to broadcaster 106', who has acquired broadcasting equipment 110' from broadcasting equipment manufacturer 108'. Broadcaster 106' in turn uses broadcasting equipment 110' to render (i.e. broadcast) content 104' for consumption by consumer 112' at the consumer's own premise, using previously acquired player 110" from player manufacturer 108". Again, the distribution of content 104' and equipment 108' and 108" may go through one or more intermediate distributors (not shown). Similar to the approach of FIG. 1, typically broadcaster 106' pays broadcast equipment manufacturer 108' for the right to own or use broadcast equipment 110', and content creator 102' for the right to render/broadcast content 104' for consumer 112'. The compensations are also in proportion to projected usage of broadcast equipment 110' and consumption of content 104', as opposed to actual usage and consumption. However, unlike the approach of FIG. 1, broadcaster 106' is typically compensated at least partially, if not exclusively, by third party sponsors, other than consumers 112', such as advertisers. In other words, while broadcaster 106' still bears the bulk of the burden of the initial investment as well as the risk of failure, part of the burden of the initial investment is shared by consumer 112' and broadcaster 106' has alternate sources of revenue (often more substantive and reliable). Examples of broadcaster 106' include traditional local and network television and radio broadcasters, as well as cable operators, satellite broadcasters, and broadcasters who broadcast over private and public data networks, such as the Internet.

While this approach has increased the aggregate consumption capacity for content 104' of content creator 102', and the aggregate demand for equipment 110' and 110" of manufacturers 108' and 108", the approach is still basically "performance promoter" centric. With broadcaster 106' still bearing the bulk of the burden of initial investment and the risk of failure, it remains a hindrance to further expansion of the aggregate consumption capacity for content 104' of content creator 102', and the aggregate demand for equipment 110' and 110" of manufacturers 108' and 108".

FIG. 3 illustrates yet another prior art approach employed to distribute and consume contents such as motion pictures and music, as well as other contents such as games. Under this approach, content creator 102" makes available a version of content 104" designed for consumption by consumer 112" at the consumer's own premise. Similarly, player manufacturer 108'" makes available and distributes a complementary version of player 108'". Again, the distribution of content 104" and players 108'" may go through one or more intermediate distributors (not shown). Using the motion picture example again, content 104" may be a VHS tape version or a CD version of the motion picture, and player 108'" may be a complementary VHS/CD player or a properly equipped "computer". While it is possible for consumer 112" to rent player 108'", typically, it is purchased by consumer 112" instead. This is especially true if content 104" is music, and player 108'" is a corresponding complementary tape/CD player.

While this approach has further increased the aggregate consumption capacity for content 104" of content creator 102, and the aggregate demand for player 110'" of player manufacturer 108'", however, under this approach, the burden of initial investment and risk bearing have been at least partially shifted to consumer 112'".

Thus, another approach that can even further increase the aggregate consumption capacity for the contents of content creators, without some of the disadvantages of the prior art approaches is desired.

SUMMARY OF THE INVENTION

A player-centric content creation, distribution and consumption method is disclosed. A computer implemented-content authoring tool (CI-CAT) is distributed to a content creator. The CI-CAT includes an identification function for embedding control information in a content created using the CI-CAT, to facilitate compensating a developer of the CI-CAT. A computer implemented-content player (CI-CP) is provided to a consumer. The CI-CP includes a recovery function for recovering the control information from the content when the content is rendered by the player, and a reporting function for reporting rendering of the content, using the recovered control information. During operation, the content is received by the consumer, and rendered using the CI-CP. The control information is recovered, and rendering of the content, using the recovered control information, is reported by the CI-CP.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art, such as multi-media contents, video, audio, graphics, texts, data and so forth. Also, parts of the description will also be presented in terms of operations performed by a computer system, using terms such as, receiving, rendering, recovering, reporting and the like. As well understood by those skilled in the art, these quantities or operations take the form of electrical, magnetic, or optical signals being stored, transferred, combined, and otherwise manipulated through electrical, magnetic and optical components of a digital system; and the term digital system includes general purpose as well as special purpose data processing machines, systems, and the like, that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 4:
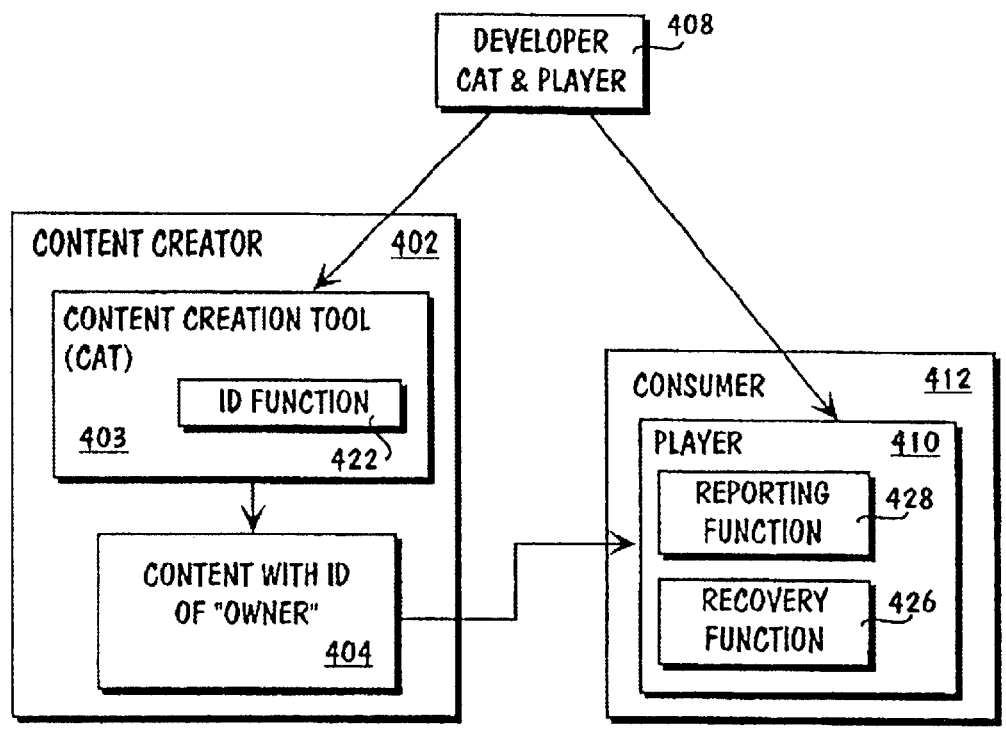
FIG. 4 illustrates an overview of the present invention for creating, distributing, and consuming contents, in accordance with one embodiment.

Referring now FIG. 4, wherein a block diagram illustrating an overview of the present invention in accordance with one embodiment is shown. As illustrated, under the present invention, developer 408 of computer implemented player 410 is also developer of computer implemented content authoring tool (CAT) 403. Developer 408 provides CAT 403 and player 410 to content creator 402 and consumer 412 respectively. For ease of understanding, only one content creator 402 and one consumer 412 is shown, however, as those skilled in the art will appreciate, in practice, the present invention may be practiced with any number of content creators 402 and consumers 412, limited only by the availability of machine resources and bandwidth. In one embodiment, the provision process includes registering the recipient of CAT 403, i.e. content creator 402, and the recipient of player 402, i.e. consumer 412. Content creator 402 uses CAT 403 (exclusively or in conjunction with other authoring tools/equipment) creates content 404. Content creator 404 in turn distributes created content 404 (with or without intermediate distributors) to consumer 412. Consumer 412 consumes content 404 using player 410. As will be described in more detail below, as an integral part of rendering content 404, player 410 reports rendering of content 404, including control information such as the identity of content as well as the identity of its owner or creator, for the purpose of facilitating provision of compensation to developer 408.

Figure 1:
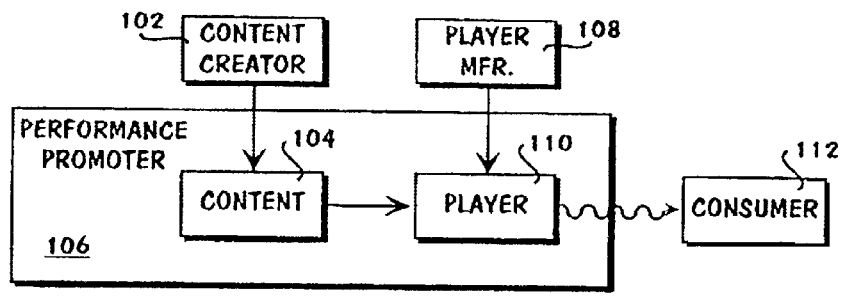
FIGS. 1–3 illustrate three prior art approaches for creating, distributing and consuming contents.
Figure 2:
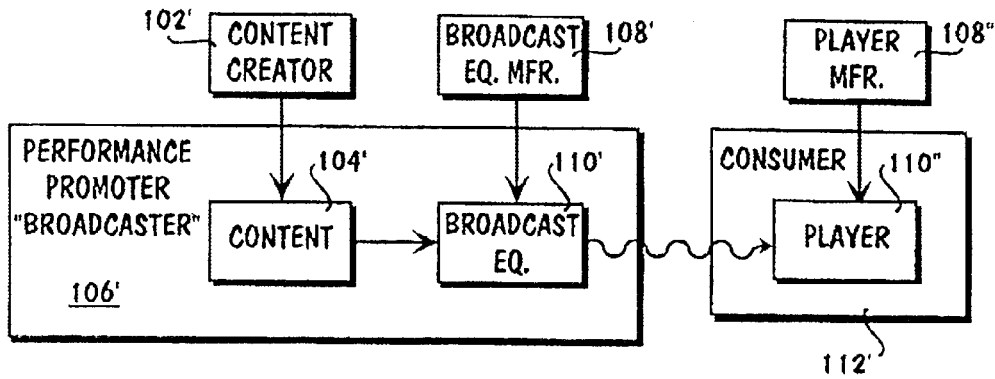
Figure 3:
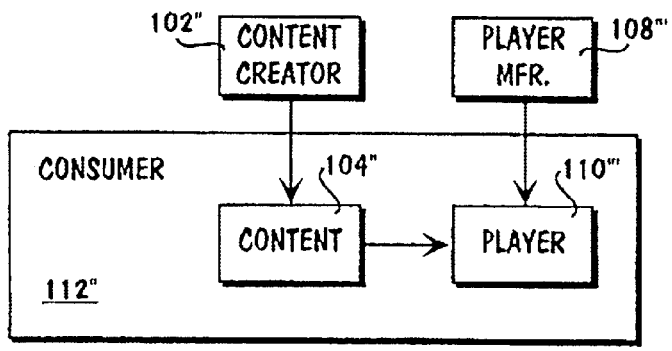

Thus, unlike any of the prior art approaches, a substantial portion of the burden of initial investment and the risk of failure is shifted to and shared by developer 408. In particular, when player 410 is provided to consumer 412 free or virtually free, consumer 412 is restored closer to his/her position under the approach of FIG. 1. Couple that with the ability to deliver content 404 to consumer 412 for consumption at consumer's premise as in the approaches of FIGS. 1 and 2, the aggregate consumption capacity for content 404 is expected to surpass both of these approaches. Further coupling that with providing content CAT 403 to content creator 402 free or virtually free, the varieties and volumes of content 404 are expected to increase over that of the prior art approaches, which in turn will fuel an increase in the number of consumer 412 wanting to be provided with player 410, leading to a circular cycle of expansion in aggregate consumption capacity and content availability.

Figure 5:
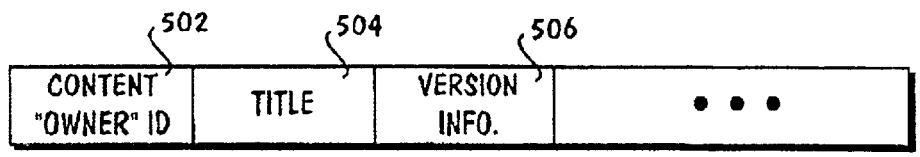
FIG. 5 illustrates an identification record in accordance with one embodiment.

Continuing to refer to FIG. 4, in accordance with the present invention, to facilitate the above outlined advantageous approach to content creation, distribution and consumption, CAT 403 is provided with identification function 422 for embedding identification record 424 in created content 404. Identification record 424 includes control information to facilitate compensation of developer 408. CAT 403, along with identification function 422, may be provided to content creator 402 using an known fixed form medium, such as tape, CD, or DVD, as well as through a private or public data network connection, e.g. a direct modem connection or through the Internet. Skipping briefly to FIG. 5, wherein an example identification record 424 in accordance with one embodiment is illustrated. For the illustrated embodiment, identification record 424 includes at least identifier 502 of content creator 402. Alternatively, identifier 502 may identify an "owner" of content 404 instead, which may or may not be content creator 402. The term "owner"

as used herein is intended to have a broad definition of what constitute "ownership". The only significant aspect of the definition is that the "owner" has the responsibility for compensating developer 408 for usage of player 410 by consumer 412 to render content 404. For the illustrated embodiment, identification record 424 also includes content identification 504 as well as version information 506 of created content 404. Other control (e.g. public key) as well as description information (e.g. title of the content) may also be included.

Returning to FIG. 4, except for identification function 422, CAT 403 is intended to represent a broad category of content authoring tools known in the art. As alluded to earlier, it may be the primary tool used to create content 404, as in the case where content 404 is a multi-media game, and CAT 403 is a collection of multi-media game authoring tool. Alternatively, it may be a post-processing tool used to create content 404, as in the case where content 404 is a motion picture or music, and CAT 403 is an editing function. Thus, identification function 422 may embed identification record 424 as integral part of content creation, as in the case where content 404 is a multi-media game, or as post-processing, as in the case where content 404 is a motion picture or a piece of music.

In one embodiment, identification function 422 embeds identification record 424 in a predetermined location of content 404, e.g. the header. In another embodiment, identification function 422 embeds identification record 424 in a deterministically selected location of content 404, e.g. computed in accordance with a checksum value of the first n bytes. In one embodiment, identification function 422 embeds identification record 424 in plain text, i.e. not encrypted. In another embodiment, identification function 422 encrypts identification record 424, e.g. using a private key, before embedding it.

Still referring to FIG. 4, content 404 is distributed to consumer 412 using any one of a number of distribution approaches known in the art (with or without using intermediate distributors, as alluded to earlier). Typically, consumer 412 pays content creator 402 or its representative for the right to obtain a copy of content 404. Payment may be tendered in advance, upon delivery or invoiced, and pricing may be title or usage based. A trial period for a part or the entire content may also be provided. In one embodiment, content 404 is distributed to consumer 412 using fixed form medium, such as diskettes, CD or DVD. Consumer 412 may pay content creator 402 or its representative via any conventional approach for tendering payment, such as cash, checks, debit/credit card charges, and so forth. In other embodiments, content 404 is distributed to consumer 412 through a wire or wireless medium, such as a cable connection, a conventional telephone connection, a digital subscriber line (DSL) connection, a satellite transmission channel, or a cellular phone connection. In addition to debit/credit cards, consumer 412 may pay content creator 402 via any modern form of electronic cash also.

When distributed over a wire or a wireless medium, preferably, content 404 is compressed in accordance with any one of a number of known compression techniques, such as MPEG1, MPEG2 and so forth. In the case of where content 404 includes 2-D/3-D model data, it may also be compressed in accordance with the data compression techniques disclosed in co-pending U.S. patent application, Ser. No. 09/399,062, contemporaneously filed, and entitled "Data Compression Through Adaptive Data Size Reduction", co-pending U.S. patent application Ser. No. 09/399,063, contemporaneously filed, and entitled "Data Compression Through Offset Representation", and co-pending U.S. patent application Ser. No. 09/399,065, contemporaneously filed, and entitled "Dynamic Scalable Multi-Media Content Streaming", which are hereby fully incorporated by reference.

Turning now to player 410, as illustrated, player 410 is provided with recovery function 426 and reporting function 428. Recovery function 426 is used to recover embedded identification record 424, when player 410 renders content 404 for consumption by consumer 412. Reporting function 428 is used to report rendering of content 404, along with identification of content creator 402, and optionally, the content identification and versioning information of content 404. For the illustrated embodiment, player 410 also includes a player identifier 427, uniquely identifies player 410 among other players. Similarly, player 410, including recovery function 426 and reporting function 428, may be provided to consumer 412 in fixed form medium, such as diskette, CD or DVD, or via a private or public data network connection, such as a direct modem connection or through the Internet.

Except for recovery function 426 and reporting function 428, player 410 is intended to represent a broad range of content players known in the art. For examples, player 410 may be a video player, music player, or a game player. In one embodiment, player 410 is packaged in the form of a plug-in to a browser, such as the Internet Explorer available from Microsoft Corp. of Redmond, Wash., and the Navigator available from Netscape of Mountain View, Calif., (now a subsidiary of America On-Line of Dulles, Va.).

Recovery function 426 is provided with either the information on where identification record 424 is embedded in content 404, and whether auxiliary processing, such as decryption, is necessary, including the complementary public key, if applicable, or alternatively, the information on where to get these configuration information. During operation, i.e. whenever player 410 is invoked to render content 404 and the like, using these configuration information provided, recovery function 410 recovers embedded identification record 424 for use by reporting function 428.

Figure 6:
FIG. 6 illustrates a reporting packet in accordance with one embodiment.

In response to the recovery of identification record 424, reporting function 428 reports usage of player 410 to render content 404, including recovered identification 502 of the "owner" of content 404, and optionally, content identification 504 and associated version information 506. In one embodiment, player identifier of player 410 is also reported. In one embodiment, reporting function 428 may also report on other usage related information, such as the date and time of the usage (see FIG. 6). Reporting may be made synchronously or in batch mode.

Figure 7:
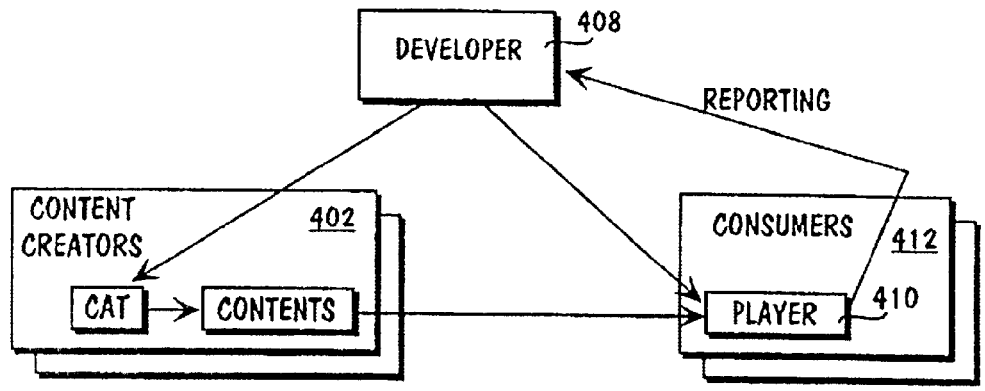
FIGS. 7–9 illustrate the process of reporting in further detail, in accordance with two embodiments.
Figure 8:
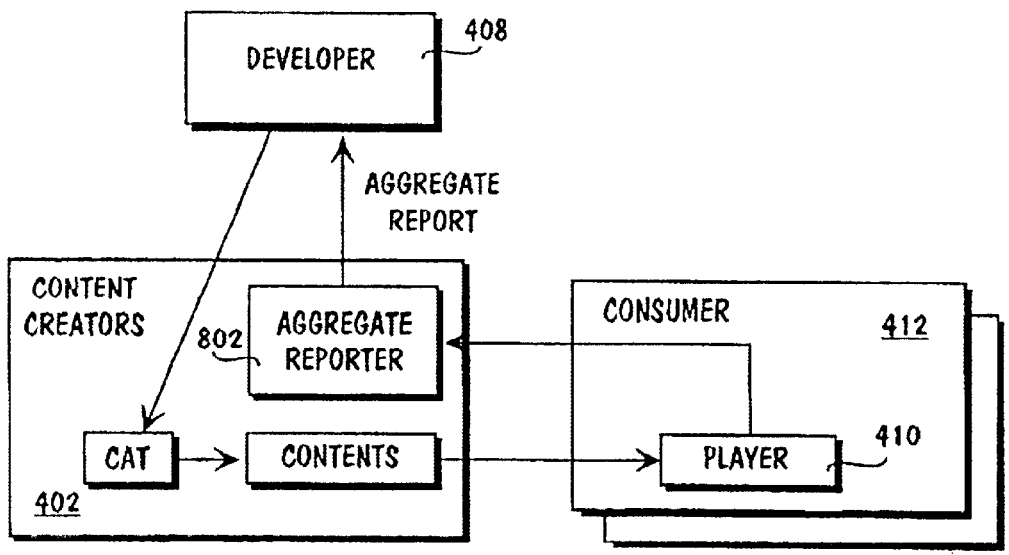
Figure 9:
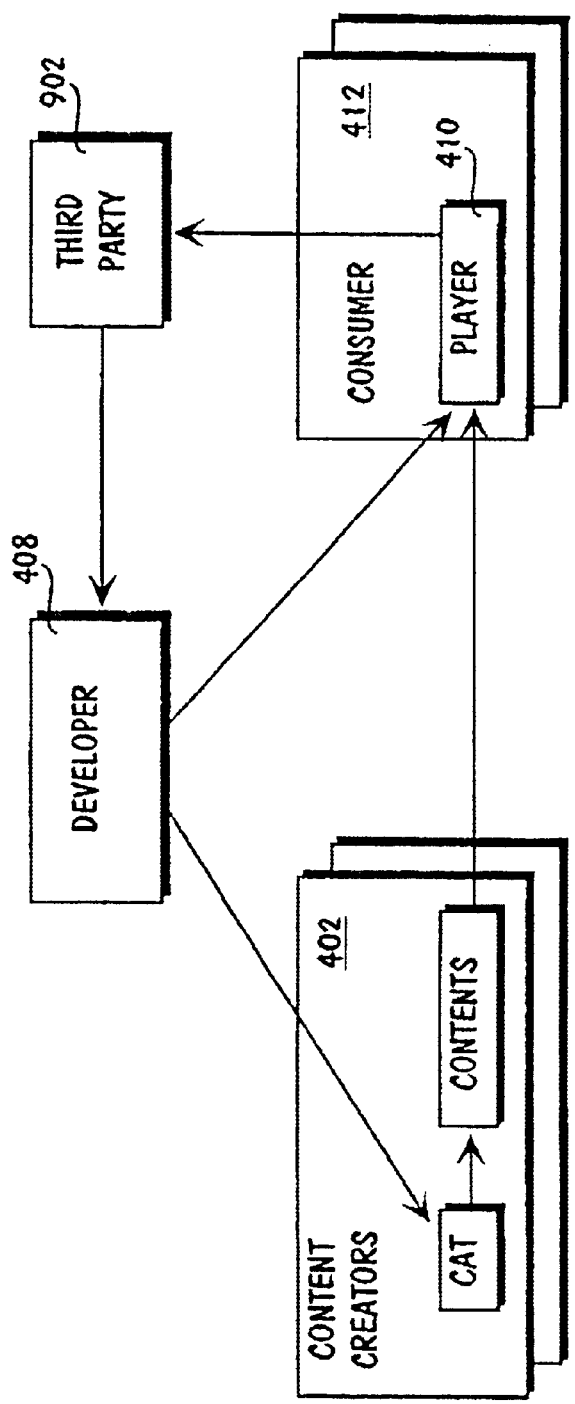

FIGS. 7–9 illustrate the process of reporting in further detail in accordance with three embodiments. In the embodiment of FIG. 7, player 410 reports usage of player 410 to render content 404 (including at least identifier 502 of the "owner" of content 404, which as discussed earlier, may or may not be content creator 402) to developer 408 directly. In the presently preferred embodiments, the reporting is made via either a private data connection, such as a direct modem connection or a public data connection, such as the Internet. Player 410 is provided with the necessary information, e.g. a Public Switching Telephone Network (PSTN) extension (phone number) or a Uniform Resource Locator (URL). Alternatively, player 410 may be provided with a data network address of developer 408 instead. In any event, developer 408 in due course collects compensation from the various content owners (or creators 402 themselves) in accordance with the cumulated usage information of consumers 412 using player 410 to render various contents 404 created using CAT 403.

In the embodiment of FIG. 8, player 410 reports usage of player 410 to render content 404 to reporter 802 of content creator or "owner" 402 (including title and version information if applicable). In the presently preferred embodiments, the reporting is also made via either a private data connection, such as a direct modem connection or a public data connection, such as the Internet. In like manner, player 410 is provided with the necessary information, i.e. a PSTN extension (phone number) or the URL of content creator 402. Alternatively, player 410 may also be provided with a data network address of content creator 402 instead. In any event, the various content owners (or creators 402 themselves), in due course, compensate developer 408 in accordance with the usage information accumulated by reporter 802 (optionally, including the applicable reports if content owners 402 and developer 408 so desired).

While the embodiment of FIG. 7 is more efficient, operationally, than the embodiment of FIG. 8, the latter embodiment has the advantage of offering consumer 412 more privacy. In particular, when consumer 412 employs player 410 to consume contents 404 from different creators or "owners", neither developer 408 nor any of the content creators/owners 402 has the ability to compile a complete profile on any one consumer's consumption habits.

FIG. 9 illustrates an alternate embodiment to FIG. 8 for further increasing consumer privacy. In the embodiment of FIG. 9, player 410 reports usage of player 410 to render content 404 (including at least identifier 502 of the "owner" of content 404) to designated third party 902 other than developer 408 or content creator/owner 402. In the presently preferred embodiments, the reporting is also made via either a private data connection, such as a direct modem connection or a public data connection, such as the Internet. In like manner, player 410 is provided with the necessary information, i.e. a PSTN extension (phone number) or the URL of third party 902. Alternatively, player 410 may also be provided with a data network address of third party 902 instead. In any event, the various content owners (or creators 402 themselves), in due course, compensate developer 408 in accordance with the usage information accumulated by third party 902.

Figure 10:
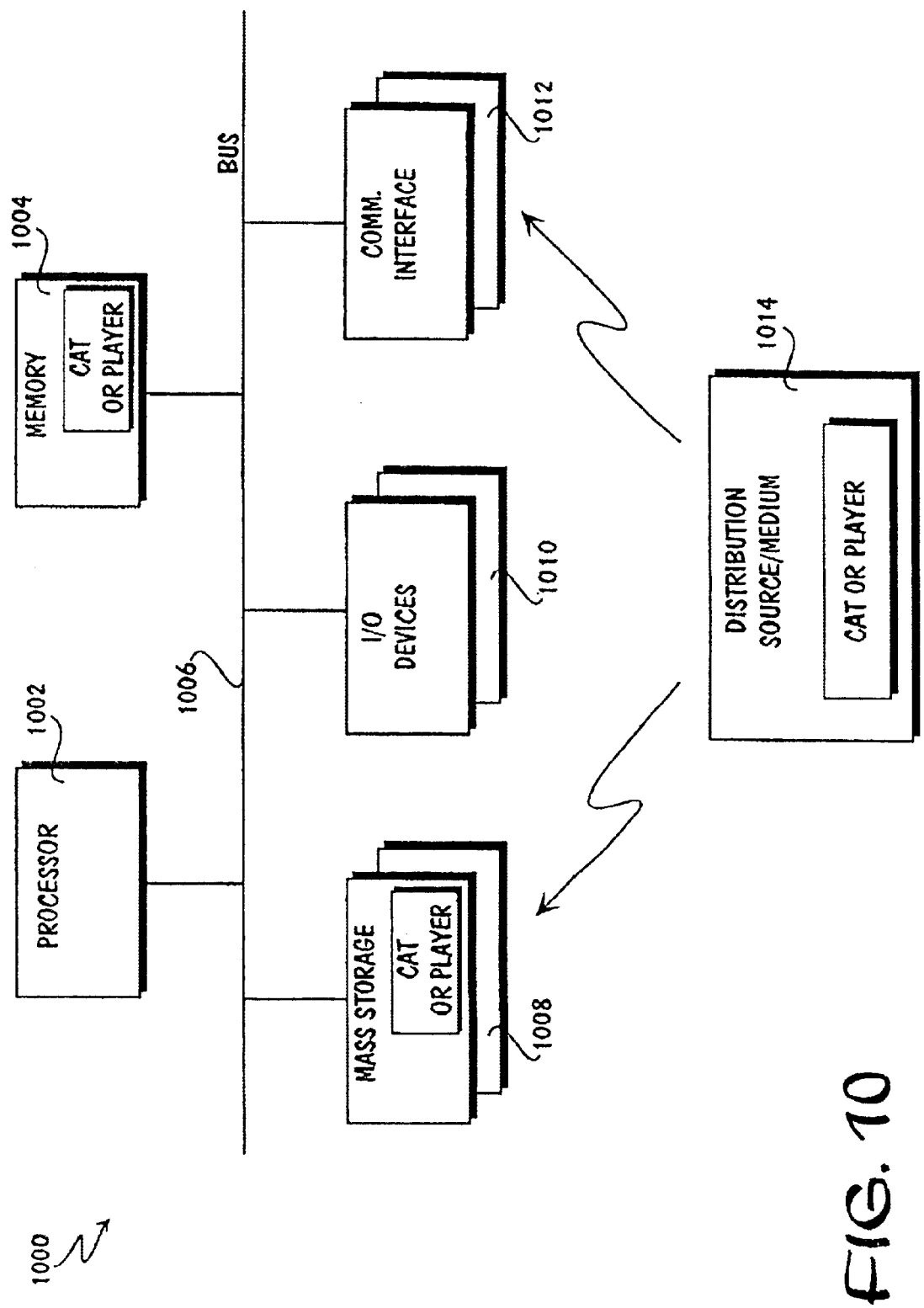
FIG. 10 illustrates an example computer system suitable for practicing as either a content creation system or a content consumption system, in accordance with one embodiment.

FIG. 10 illustrates one embodiment of a computer system suitable for use to practice as either a content creation system or a consumer system of the present invention. As shown, computer system 1000 includes processor 1002 and memory 1004 coupled to each other via system bus 1006. Typically (although not necessary), for use as a content creation system, i.e. execution of CAT 403, processor 1002, memory 1004, and system bus 1006 are usually higher performance models of these elements, whereas for use as a consumer system, i.e. execution of player 410, the lower performance models are employed instead. Coupled to system bus 1006 are non-volatile mass storage 1008, such as hard disks, floppy disk, and so forth, input/output devices 1010, such as keyboard, displays, and so forth, and communication interfaces 1012, such as modem, LAN interfaces, and so forth. Each of these elements perform its conventional functions known in the art. In particular, system memory 1004 and non-volatile mass storage 1008 are employed to store a working copy and a permanent copy of the programming instructions implementing the above described teachings of the present invention, e.g. an underlying operating system, and CAT 403 or player 410. System memory 1004 and non-volatile mass storage 1006 may also be employed to store content 404. As described earlier, the permanent copy of the programming instructions implementing CAT 403 or player 410 is preferably loaded through communication interfaces 1012. The constitution of elements 1002–1014 are well known, and accordingly will not be further described.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a player-centric method and apparatus for creating, distributing and consuming contents has been described.

What is claimed is:

1. A computer implemented content creation, distribution and consumption method comprising:

providing a computer implemented-content authoring tool (CI-CAT) to a content creator, the CI-CAT including an identification function for embedding control information in a content created using the CI-CAT, to facilitate compensating a developer of the CI-CAT;

providing a computer implemented-content player (CI-CP) to a consumer, the (CI-CP) including a recovery function for recovering said control information from the content when the content is rendered by the player, and a reporting function for reporting rendering of the content using said recovered control information;

receiving the content by the consumer, and rendering the content using the CI-CP; and recovering the control information, and reporting the rendering of the content using said recovered control information, by the CI-CP.

2. The method of claim 1, wherein the control information includes a content owner identifier identifying a selected one of (a) the content creator, who is also a distributor, (b) the content creator, who is not a distributor, and (c) a distributor, who is not the content creator, the recovery function recovers the content owner identifier, and the reporting function includes the recovered content identifier in said reporting.

3. The method of claim 1, wherein the control information includes a content identification, the recovery function recovers the content identification, and the reporting function includes the recovered content identification in said reporting.

4. The method of claim 1, wherein the control information includes versioning information, the recovery function recovers the versioning information, and the reporting function includes the recovered versioning information in said reporting.

5. The method of claim 1, wherein the CI-CP includes a player identifier, and said reporting includes the player identifier.

6. The method of claim 1, wherein said providing of the CI-CAT includes registration of the content creator.

7. The method of claim 1, wherein said providing of the CI-CP includes registration of the consumer.

8. The method of claim 1, wherein said receiving comprises receiving said content from a selected one of (a) the content creator, who is also a distributor, (b) the content creator, who is not a distributor, and (c) a distributor, who is not the content creator.

9. The method of claim 1, wherein said reporting comprises reporting to a selected one of (a) a developer of the CI-CAT, (b) a developer of the CI-CP, (c) an owner of the content, (d) a creator of the content, and (e) a third party, independent of the developer of the CI-CAT or the CI-CP, and the owner or creator of the content.

10. The method of claim 1, wherein the content comprises selected ones of audio, video, graphics, text and data.

11. A computer implemented content creation and distribution method comprising:
   embedding control information in a content using a computer implemented-content authoring tool (CI-CAT), to facilitate compensation of a developer of the CI-CAT; and
   distributing the content, including the embedded control information, for rendering by a computer implemented-content player (CI-CP) that includes a recovery and a reporting function, where the recovery function recovers the embedded control information when the CI-CP renders the content, and the reporting function reports rendering of the content, using the recovered control information.

12. The method of claim 11, wherein the control information includes a content owner identifier identifying a selected one of (a) a creator of the content, who is also a distributor, (b) a creator of the content, who is not a distributor, and (c) a distributor of the content, who is not the creator of the content, the recovery function recovers the control information, and the reporting function includes the recovered control information in said reporting.

13. The method of claim 11, wherein the control information includes a content identification, the recovery function recovers the content identification, and the reporting function includes the content identification in said reporting.

14. The method of claim 11, wherein the control information includes versioning information, the recovery function recovers the versioning information, and the reporting function includes the recovered versioning information in said reporting.

15. The method of claim 11, wherein the method further includes providing the CI-CAT to a creator of the content, and registering the content creator.

16. The method of claim 11, wherein said distribution is performed by a selected one of (a) a creator of content and (b) a distributor, who is not the creator of the content.

17. The method of claim 11, wherein the content comprises at least a selected one of audio, video, graphics, text and data.

18. A computer server comprising:
   a processor to execute programming instructions; and
   a storage medium, coupled to the processor, having stored therein a first plurality of programming instructions to be executed by the processor, the first plurality of programming instructions, when executed, implement a content authoring tool (CAT) that includes an identification function for embedding control information in a content to facilitate compensation of a developer of the CAT, and to prepare the content for distribution to a consumer computer equipped with a content player (CP) having a recovery and a reporting function, where the recovery function recovers the embedded control information when the CP renders the content, and the reporting function reports rendering of the content using the recovered control information.

19. The computer server of claim 18, wherein when executed, the identification function embeds a content owner identifier that identifies a selected one of (a) a creator of the content, who is also a distributor, (b) a creator of the content, who is not a distributor, and (c) a distributor of the content, who is not the creator of the content.

20. The computer server of claim 18, wherein when executed, the identification function further embeds a content identification in the content, and the recovery and reporting functions are further equipped to recover and report the content identification respectively.

21. The computer server of claim 18, wherein when executed, the identification function further embeds versioning information in the content, and the recovery and reporting functions are further equipped to recover and report the versioning information respectively.

22. The computer server of claim 18, wherein the storage medium further having stored therein, a second plurality of programming instructions that implement a distribution function, wherein when executed, distributes the content, including the embedded control information.

23. The computer server of claim 18, wherein the content comprises at least a selected one of audio, video, graphics, text and data.

24. A computer server comprising:
   a processor to execute programming instructions; and
   a storage medium, coupled to the processor, having stored therein a first plurality of programming instructions to be executed by the processor, the first plurality of programming instructions, when executed, implement a distribution function that distributes content having embedded therein control information to facilitate compensation of a developer of a content authoring tool with which the content was created, to a consumer computer equipped with a content player (CP) having a recovery and a reporting function, where the recovery function recovers the embedded control information when the CP renders the content, and the reporting function reports rendering of the content using the recovered control information.

25. A computer implemented content consumption method comprising:
   receiving by a consumer a content having embedded therein control information to facilitate compensation of a developer of a content authoring tool with which the content was created, the consumer having been provided with a computer implemented-content player (CI-CP) equipped with a recovery function to recover the control information when the CI-CP renders the content, and a reporting function to report rendering of the content using the recovered control information;
   rendering the content using the CI-CP;
   recovering the embedded control information by the CI-CP; and
   reporting rendering of the content by the CI-CP using the recovered control information.

26. The computer method of claim 25, wherein the control information includes a content owner identifier identifying a selected one of (a) a creator of the content, who is also a distributor, (b) a creator of the content, who is not a distributor, and (c) a distributor, who is not the creator of the content, said recovery includes recovering the content identification, and said reporting includes reporting the recovered content identification.

27. The computer method of claim 25, wherein the control information includes a content identification, said recovery includes recovering the content identification, and said reporting includes reporting the recovered content identification.

28. The computer method of claim 25, wherein the control information includes versioning information, said recovery includes recovering the versioning information, and said reporting includes reporting the recovered versioning information.

29. The computer method of claim 25, wherein the CI-CP includes a player identifier, and said reporting further includes the player identifier.

30. The computer method of claim 25, wherein the method further includes providing the CI-CAT to the consumer, and registering the consumer.

31. The computer method of claim 25, wherein said receiving comprises receiving said content from a selected one of (a) a creator of the content, who is also a distributor, (b) a creator of the content, who is not a distributor, and (c) a distributor, who is not the creator of the content.

32. The computer method of claim 25, wherein said reporting comprises reporting to a selected one of (a) a developer of a computer implemented-content authoring tool (CI-CAT) used to create the content, (b) a developer of the CI-CP, (c) an owner of the content, (d) a creator of the content, and (e) a third party, independent of the developer of the CI-CAT or the CI-CP, and the owner or creator of the content.

33. The computer method of claim 25, wherein the content comprises at least a selected one of audio, video, graphics, text and data.

34. A consumer computer system comprising:
 a processor to execute programming instructions; and
 a storage medium, coupled to the processor, having stored therein, a first plurality of programming instructions to be executed by the processor, wherein when executed, the first plurality of programming instructions implement a content player (CP) for rendering received content, the content player including a recovery function to recover control information embedded in the content, the control information to facilitate compensation of a developer of a content authoring tool with which the content was created, and a reporting function to report rendering of the content using the recovered control information.

35. The consumer computer system of claim 34, wherein the control information includes a content owner identifier identifying a selected one of (a) a creator of the content, who is also a distributor, (b) a creator of the content, who is not a distributor, and (c) a distributor, who is not the creator of the content, the recovery recovers the content owner identification, and the reporting function includes the recovered content owner identification in said reporting.

36. The consumer computer system of claim 34, wherein the control information includes a content identification, the recovery function recovers the content identification, and the reporting function includes the recovered content identification in said reporting.

37. The consumer computer system of claim 34, wherein the control information includes versioning information, the recovery function recovers the versioning information, and the reporting function includes the recovered versioning information in said reporting.

38. The consumer computer system of claim 34, wherein the CP includes a player identifier, and the reporting function further reports the player identifier.

39. The consumer computer system of claim 34, wherein the storage medium further having stored therein a second plurality of programming instructions, wherein when executed, the second plurality of programming instructions facilitate receiving of the CP, and registering the consumer computer system.

40. The consumer computer system of claim 34, wherein the storage medium further having stored therein a second plurality of programming instructions, wherein when executed, the second plurality of programming instructions facilitate receiving said content from a selected one of (a) a creator of the content, who is also a distributor, (b) a creator of the content, who is not a distributor, and (c) a distributor, who is not the creator of the content.

41. The consumer computer system of claim 34, wherein said reporting function reports to a selected one of (a) a developer of a computer implemented-content authoring tool (CI-CAT) used to create the content, (b) a developer of the CP, (c) an owner of the content, (d) a creator of the content, and (e) a third party independent of the developer of the CI-CAT or the CP, and the owner or creator of the content.

42. The consumer computer system of claim 34, wherein the content comprises at least a selected one of audio, video, graphics, text and data.

* * * * *

UNITED STATES PATENT AND TRADEMARK OFFICE
CERTIFICATE OF CORRECTION

PATENT NO. : 6,957,195 B1 Page 1 of 1
APPLICATION NO. : 09/399064
DATED : October 18, 2005
INVENTOR(S) : Jeremy A. Kenyon and Alex K. St. John It is certified that error appears in the above-identified patent and that said Letters Patent is hereby corrected as shown below:

Column 4
Line 58, "...using an known..." should read --...using a known...--.

Column 5
Line 2, "...what constitute ownership..." should read --..what constitutes ownership...--.

Column 8
Line 14, "...method and apparatus...has been described..." should read --...method and apparatus...have been described...--.

Signed and Sealed this

Fifth Day of June, 2007

JON W. DUDAS
*Director of the United States Patent and Trademark Office*